(12) United States Patent
Zheng et al.

(10) Patent No.: US 11,528,991 B2
(45) Date of Patent: Dec. 20, 2022

(54) SHELF POWER SUPPLY SYSTEM

(71) Applicants: Self Electronics Co., Ltd., Zhejiang (CN); Wanjiong Lin, Zhejiang (CN); Self electronics USA Corporation, Norcross, GA (US)

(72) Inventors: Zhaoyong Zheng, Zhejiang (CN); Chengke Zhang, Zhejiang (CN)

(73) Assignee: Self Electronics Co., Ltd., Ningbo (CN)

( * ) Notice: Subject to any disclaimer, the term of this patent is extended or adjusted under 35 U.S.C. 154(b) by 185 days.

(21) Appl. No.: 16/915,655

(22) Filed: Jun. 29, 2020

(65) Prior Publication Data
US 2021/0007483 A1    Jan. 14, 2021

(30) Foreign Application Priority Data
Jul. 12, 2019    (CN) .......................... 201910631709.4

(51) Int. Cl.
*A47B 96/02*    (2006.01)
*H02G 11/00*    (2006.01)
*H01R 25/14*    (2006.01)

(52) U.S. Cl.
CPC ........... *A47B 96/025* (2013.01); *H01R 25/14* (2013.01); *H02G 11/006* (2013.01)

(58) Field of Classification Search
CPC .... H01R 13/6666; H01R 25/14; H01R 25/16; H01R 25/161; H01R 25/162; H01R 25/168; H02G 11/006; H02G 11/003; H02G 11/002
See application file for complete search history.

(56) References Cited

U.S. PATENT DOCUMENTS

| | | | |
|---|---|---|---|
| 6,146,158 A * | 11/2000 | Peratoner | H01R 25/142 439/121 |
| 9,212,848 B2 * | 12/2015 | Kendall | F25D 25/021 |
| 9,835,320 B2 * | 12/2017 | Zhang | F21S 4/28 |
| 2014/0235093 A1 * | 8/2014 | Harlan | H01R 25/142 439/370 |

* cited by examiner

*Primary Examiner* — Oscar C Jimenez
*Assistant Examiner* — Paul D Baillargeon
(74) *Attorney, Agent, or Firm* — Wang Law Firm, Inc.

(57) ABSTRACT

A shelf power supply system has a power supply track and a first power taking head and a retractable power supply track, the first power taking head has an external wiring. The retractable power supply track has a first moving part electrically connected to the external wiring and a second moving part being electrically connected with the first moving part and slideable thereon. The second moving part has a terminal. The invention can solve the problems that the wiring is complex and difficult to hide in the power supply system of the low-voltage lamps installed in the shelves and the laminates, suitable for the shelf support arms with different lengths, the size is small, the operation is very convenient, and one track can power multi-layer lamps, avoiding complex winding in the shelf, which is very simple operation and convenient for hidden installation in the shelf.

16 Claims, 11 Drawing Sheets

SHELF POWER SUPPLY SYSTEM

RELATED APPLICATION

This application claims priority to a Chinese Patent Application No. CN 201910631709.4, filed on Jul. 12, 2019.

FIELD OF THE TECHNOLOGY

The present invention relates to the field of power supply technology, with particular emphasis on a shelf power supply system.

BACKGROUND OF THE INVENTION

The use of shelves is very wide, such as in shopping malls, logistics warehousing, factory warehouses, etc., all need shelves to place items that are being sold or not immediately used. In order to better display product details, enable consumers to have a comprehensive and intuitive understanding of the product, and create a good marketing atmosphere, lighting fixtures are usually set on the shelves.

At present, the power supply on the shelf is mainly set on the back of the shelf, and powers the lamps through interconnecting wires. In this way, it is often necessary to provide perforations on the shelf or wire the wires from the back of the shelf to the front of the shelf, which leads to inconvenient installation and difficult maintenance; if multiple LED lamps are installed in the shelf, it will cause the multiple wires are messy and interlaced, occupying more space, and affecting the overall appearance of the shelves and the effect of product display.

In the prior art, power supply tracks will be provided to solve the above problems, but in the prior art, most of them use fixed tracks, which can be adapted to the installation of electrical appliances by changing the position of the power box installed on the tracks, However, in the actual installation of shelves, the depth of the shelves is different, and the fixed-length power supply tracks are not suitable. Therefore, in the prior art, vertical fixed guide tracks are mostly arranged near the uprights of the shelves, and then the power box is set according to the height of the layer boards, and the external wiring of the power box is connected to the lamp for power supply. The exposed wire needs to be coiled and fixed, which is not only unsightly, but also has potential safety hazards.

BRIEF SUMMARY OF THE INVENTION

In view of this, the present invention provides a shelf power supply system to solve the above technical problems.

A shelf power supply system, comprising a power supply track and a first power taking head arranged on the power supply track, the first power taking head has an external wiring, characterized in that the shelf power supply system further comprises a retractable power supply track, and the retractable power supply track comprises a first moving part electrically connected to the external wiring and a second moving part being electrically connected with the first moving part and slideable thereon, and the second moving part has a terminal.

advantageously, the power supply track is vertically arranged on or near the column of the shelf, and the retractable power supply track is set on the support arm of the shelf.

advantageously, the first moving part comprises:
slide track;
two electrical contacts, fixedly arranged on the slide track;
and the second moving part includes:
a track, which is matched with the slide track;
two conductive strips, provided on the track and extend along the length direction thereof, and two electrical contacts maintain electrical contact with the conductive strips, respectively.

advantageously, the second moving part further includes a second power taking head provided on the track, the terminal is electrically connected to the second power taking head.

advantageously, the second power taking head is detachably fixedly installed on the track.

advantageously, the second power taking head includes:
bottom cover;
an upper cover, which is arranged on the bottom cover and forms a installation cavity between the two;
two elastic electrical contacts, respectively used for electrically connecting a conductive strip, the main body are arranged in the installation cavity, and one end of the elastic electrical contact extends out of the installation cavity and is in electrical contact with a corresponding conductive strip when the second power taking head is disposed on the track.

advantageously, the cross section of the track is a U-shaped groove, and two conductive strips are respectively disposed on both sides of the U-shaped groove.

advantageously, the elastic electrical contact includes a positioning portion located in the installation cavity and an elastic piece which is formed and extends out of the installation cavity from the positioning portion, and the positioning portion is electrically connected to the terminal.

advantageously, the elastic pieces of the two elastic electrical contacts are bent toward opposite sides and respectively abut against the corresponding conductive strips, making the elastic pieces tensioning to achieve the fixed installation of the second power taking head.

advantageously, both sides of the U-shaped groove of the track are respectively provided with grooves perpendicular to the corresponding side and arranged face to face, and the grooves are used for installing the conductive strips.

advantageously, the depth of the groove is greater than the width of the conductive strip in the direction perpendicular to the vertical side of the U-shaped groove.

advantageously, the electrical contact is formed by bending a bar-shaped metal rod.

advantageously, the electrical contact includes a wiring portion connected with the slide track and an elastic portion bent into a V shape on both sides, and the elastic portions of the two electrical contacts snap into the grooves on both sides and abut against the corresponding conductive strip.

advantageously, end covers are provided at both ends of the slide track, and the end cover close to the power supply track has a mounting section extending toward the middle of the slide track, and the mounting section is used to install the electrical contact.

advantageously, a wire mounting groove is provided at the bottom of the slide track.

advantageously, the slide track is further provided with a wire sealing cover that is engaged with the wire mounting groove.

advantageously, the mounting section is inserted into the wire mounting groove, and one side of the mounting section facing the wire mounting groove is provided with a strip-shaped groove for fixing the electrical contact, and the strip-shaped groove is provided with a fixing hole and an opening, and in the electrical contact, the wiring portion has a rectangular bending which gets stuck into the fixing hole, and the elastic portion extends out of the opening.

advantageously, the slide track is overlaid on the track, and the slide track is also a U-shaped groove structure, which is arranged opposite to the U-shaped groove of the track, and the inner sides of both sides of the slide track are provided with convex edges, and the outer sides of the track are provided with clamping grooves matching the convex edges.

advantageously, the first power taking head or/and the second power taking head is provided with a PCB with a polarity conversion circuit.

Technical Effect of the Invention

The shelf power supply system of the invention can solve the problems that the wiring is complex and difficult to hide in the power supply system of the low-voltage lamps installed in the shelves and the laminates, suitable for the shelf support arms with different lengths, Moreover, the size is small, the operation is very convenient, and one track can power multi-layer lamps, avoiding complex winding in the shelf, which is very simple operation and convenient for hidden installation in the shelf.

BRIEF DESCRIPTION OF THE DRAWINGS

The following describes embodiments of the present invention with reference to the accompanying drawings, in which.

DETAILED DESCRIPTION OF THE INVENTION

Hereinafter, specific embodiments of the present invention will be described in further detail based on the drawings. It should be understood that the description of the embodiments of the present invention is not intended to limit the protection scope of the present invention.

As shown in FIG. 1-11, the shelf power supply system of this embodiment includes a power supply track 100, a first power taking head 200 disposed on the power supply track 100, and a retractable power supply track 300. Wherein, the first power taking head 200 has an external wiring 201, and the shelf power supply system further includes a retractable power supply track 300, which includes a first moving part 301 electrically connected to the external wiring 201 and a second moving part 302 being electrically connected with the first moving part 301 and slideable thereon, and the second moving part 302 has a terminal 304. The power supply track 100 can be powered by an external power supply.

On the basis of the power supply track 100, the present invention adds a retractable power supply track 300 to be electrically connected to a first power taking head 200, thus, the retractable power supply track 300 and the power supply track 100 can be used together and the application range is improved. The power supply track 100 can be distributed by setting a plurality of first power taking heads 200, and at the same time, the length of the retractable power supply track 300 can be adjusted according to the change of the installation position of the lamp to reduce the length of the external wiring, which is convenient to install and flexible to use.

Figure 1:
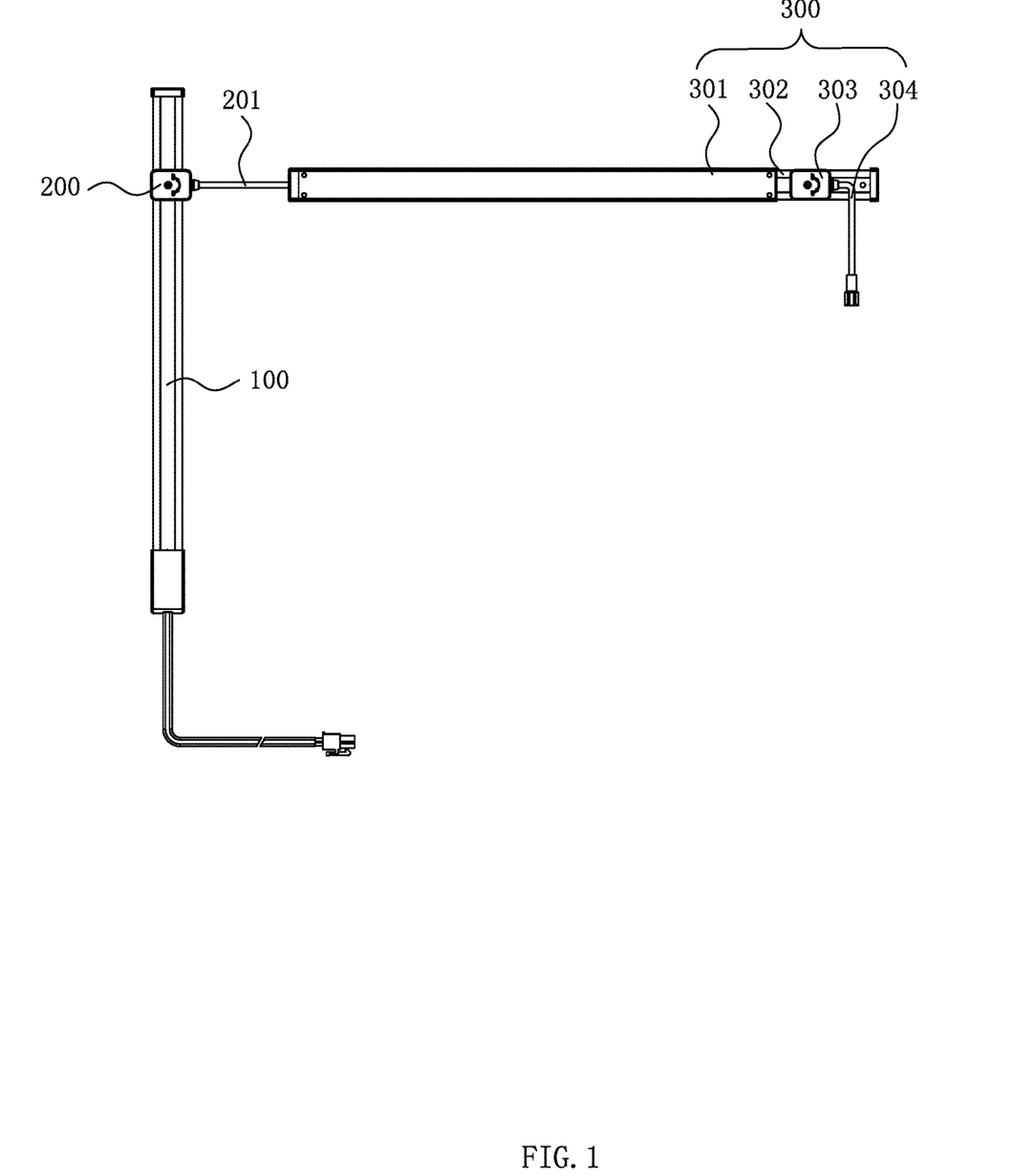
FIG. 1 is a schematic structural diagram of a shelf power supply system of the present invention.
Figure 2:
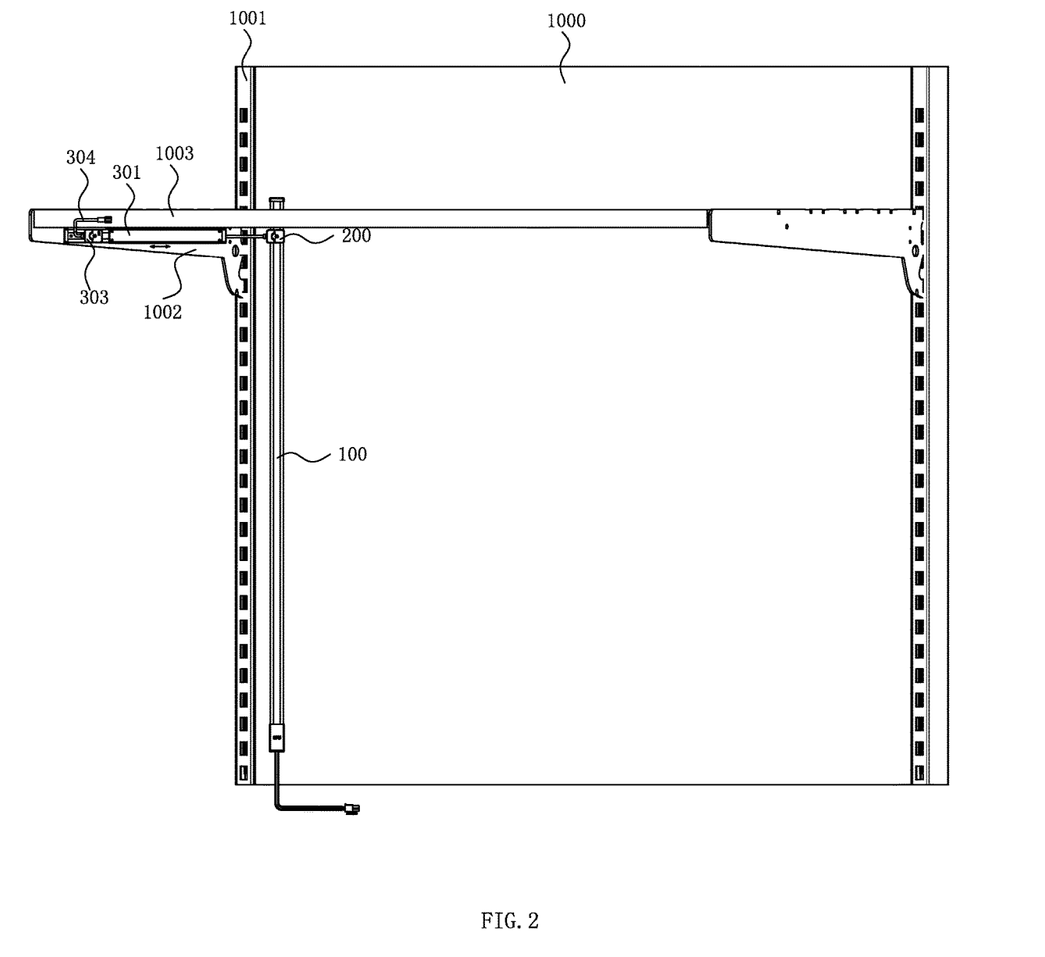
FIG. 2 is a schematic structural diagram of a shelf power supply system of the present invention after application.

The retractable power supply track 300 is suitable for the case where the distance between the installation position of the lamp and the power supply track 100 changes, therefore, it is especially suitable for the shelves with large number and variety of installation positions of lamps. In order to simplify the installation, in this embodiment, the power supply track 100 is vertically disposed on or near the column 1001 of the shelf 1000 during installation, and the retractable power supply track 300 is disposed on the support arm 1002 of the shelf 1000. The support arm 1002 is fixed to the column 1001, and the length of the support arm 1002 varies according to the depth of the laminate 1003. Therefore, the length of the retractable power supply track 300 can also be adjusted adaptively to provide the most suitable lighting installation, making the power supply line simple and neat, beautiful and safe.

The power supply track 100 and the retractable power supply track 300 can be fixed with screws, snaps, or other locking structures. To facilitate installation and disassembly, magnets can be provided on the back of the power supply track 100 and the retractable power supply track 300 for fixing.

Figure 3:
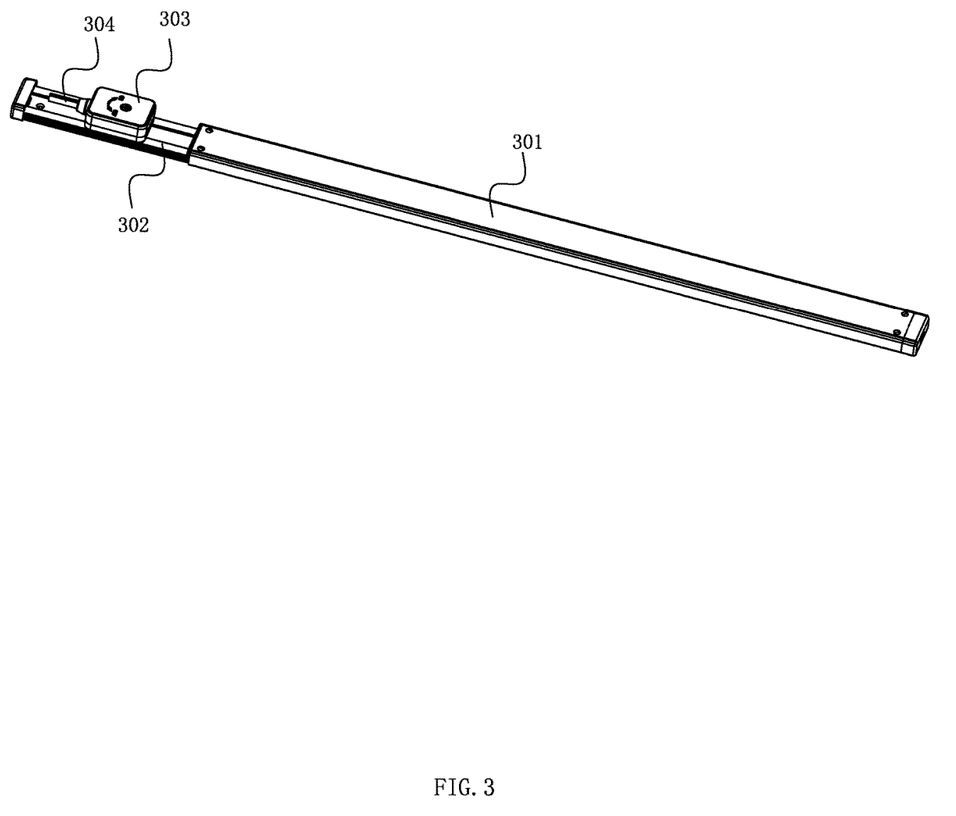
FIG. 3 is a schematic structural diagram of a retractable power supply track of the present invention.

The retractable power supply track 300 means that the first moving part 301 is electrically connected to the first power taking head 200, and then the second moving part 302 is slideable relative to the first moving part 301 to form a power supply track with a varying length. The second moving part 302 is provided with a terminal 304 to output power. There are many ways for the first moving part 301 and the second moving part 302 to realize sliding electrical connection. In order to simplify the structure and facilitate use, in this embodiment, the first moving part 301 includes a slide track 3011 and two electrical contacts 3012 and the two electrical contacts 3012 are fixedly arranged on the slide track 3011; the second moving part 302 includes a track 3021 and two conductive strips 3022. The track 3021 is matched with the slide track 3011. Two conductive strips 3022 are provided on the track 3021 and extend along the length direction of the track 3021. The two electrical contacts 3012 maintain electrical contact with the conductive strip 3022, respectively.

The above arrangement can also be switched, the second moving part 302 uses electrical contacts, the first moving part 301 uses conductive strips, or both can use conductive strips.

The terminal 304 can be directly electrically connected to the conductive strip 3022 on the track 3021, for example, by welding. In order to improve the installation flexibility, so that the charging position can be changed, in this embodiment, the second moving part 302 further includes a second power taking head 303 on the track 3021, the terminal 304 is electrically connected to the second power taking head 303.

Figure 4:
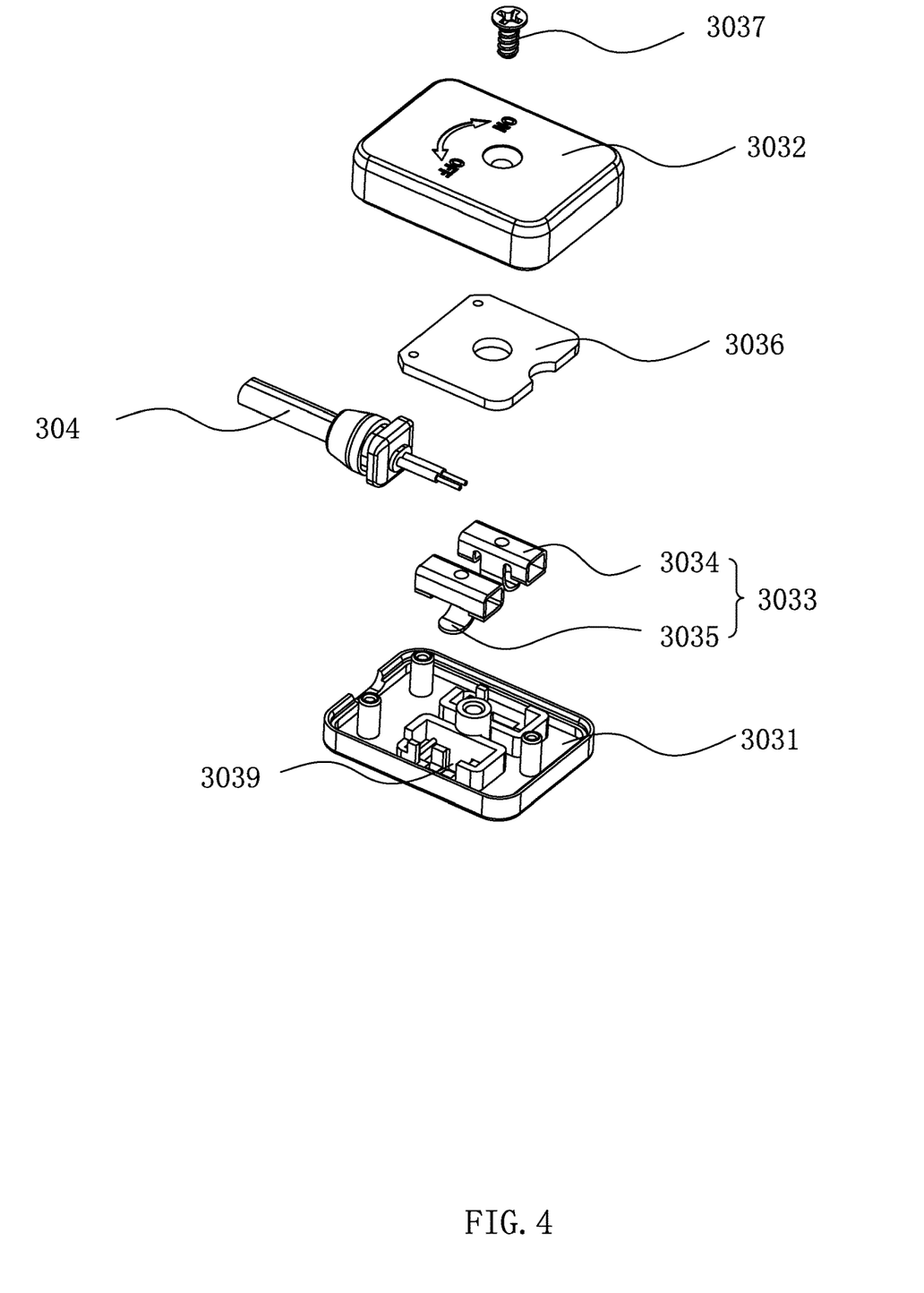
FIG. 4 is an exploded schematic view of a second power taking head of the present invention.

There are many installation methods for the second power taking head 303, which can be either sliding installation or fixed installation. In order to ensure a good electrical contact effect and facilitate the change of the installation position at the same time, in this embodiment, the second power taking head 303 is detachable fixedly mounted on the track 3021. Specifically, the second power taking head 303 includes a bottom cover 3031, an upper cover 3032, and two elastic electrical contacts 3033. The upper cover 3032 is disposed on the bottom cover 3031 and an installation cavity is formed between the two; two elastic electrical contacts 3033 are respectively used to electrically connect a conductive strip 3022, the main body of the two elastic electrical contacts are disposed in the installation cavity. One end of the elastic electrical contact extends out of the installation cavity and is in electrical contact with a corresponding conductive strip 3022 when the second power taking head 303 is disposed on the track 3021. The upper cover 3032 and the bottom cover 3031 are fixedly connected by screws 3037.

Figure 5:
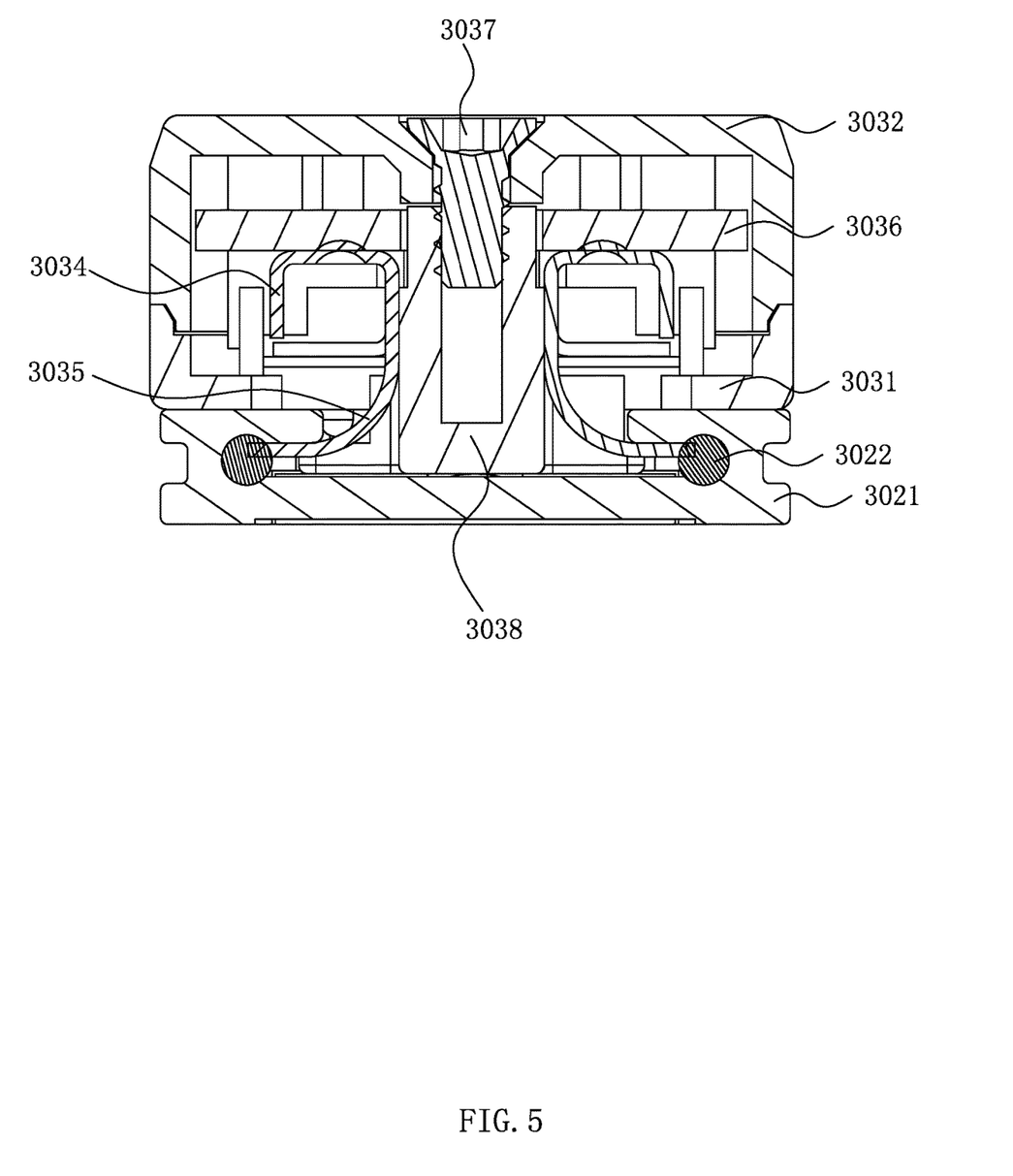
FIG. 5 is a schematic cross-sectional view of a retractable power supply track of the present invention at the installation position of a second power taking head.

The cross section of the track 3021 is a U-shaped groove, and two conductive strips 3022 are respectively disposed on both sides of the U-shaped groove. The elastic electrical contact 3033 includes a positioning portion 3034 located in the installation cavity and an elastic piece 3035 which is formed and extends out of the installation cavity from the positioning portion 3034. The positioning portion 3034 is electrically connected to the terminal 304. The elastic pieces 3035 of the two elastic electrical contacts 3033 are bent toward the opposite sides, respectively abutting against the corresponding conductive strips 3022 to make the elastic pieces tensioning to achieve the fixed installation of the second power taking head. The second power taking head 303 of this embodiment is fixed and detached by means of rotating installation.

In the process of use, the user inserts the elastic piece 3035 into the U-shaped groove of the track along the length direction, and then rotates the second power taking head 303, so that the elastic piece 3035 is rotated to a position perpendicular to the length direction and abuts against the conductive strip 3022 to achieve the purpose of electrical connection. During the rotation of the second power taking head 303, the elastic piece 3035 is partially pressed by the conductive strip 3022 to generate pressure. The pressure is transmitted to the elastic piece 3035, causing elastic deformation of the elastic piece 3035. Due to the fixed position of the positioning part 3034, the pressure cannot be transmitted, so that the elastic piece 3035 is pressed against the conductive strip 3022 under the action of the elastic deformation force, so as to achieve the purpose of tightly connecting the elastic piece 3035 and the conductive strip 3022, thereby achieving electrical connection.

A plurality of second power taking heads 303 can be connected in parallel on the track 3021, and the second power taking head 303 can be rotated 90° on the track and then installed. By providing a PCB 3036 with a polarity conversion circuit, the polarity conversion circuit can adopt the existing technology, so there is no polarity when installing. The thickness of the track is only 3.5 mm, and the width of the entire system is only 2 cm. In order to prevent reverse installation, anti-reverse structure is also provided. The PCB 3036 is provided with contacts that are electrically connected to the two elastic electrical contacts 3033.

Figure 6:
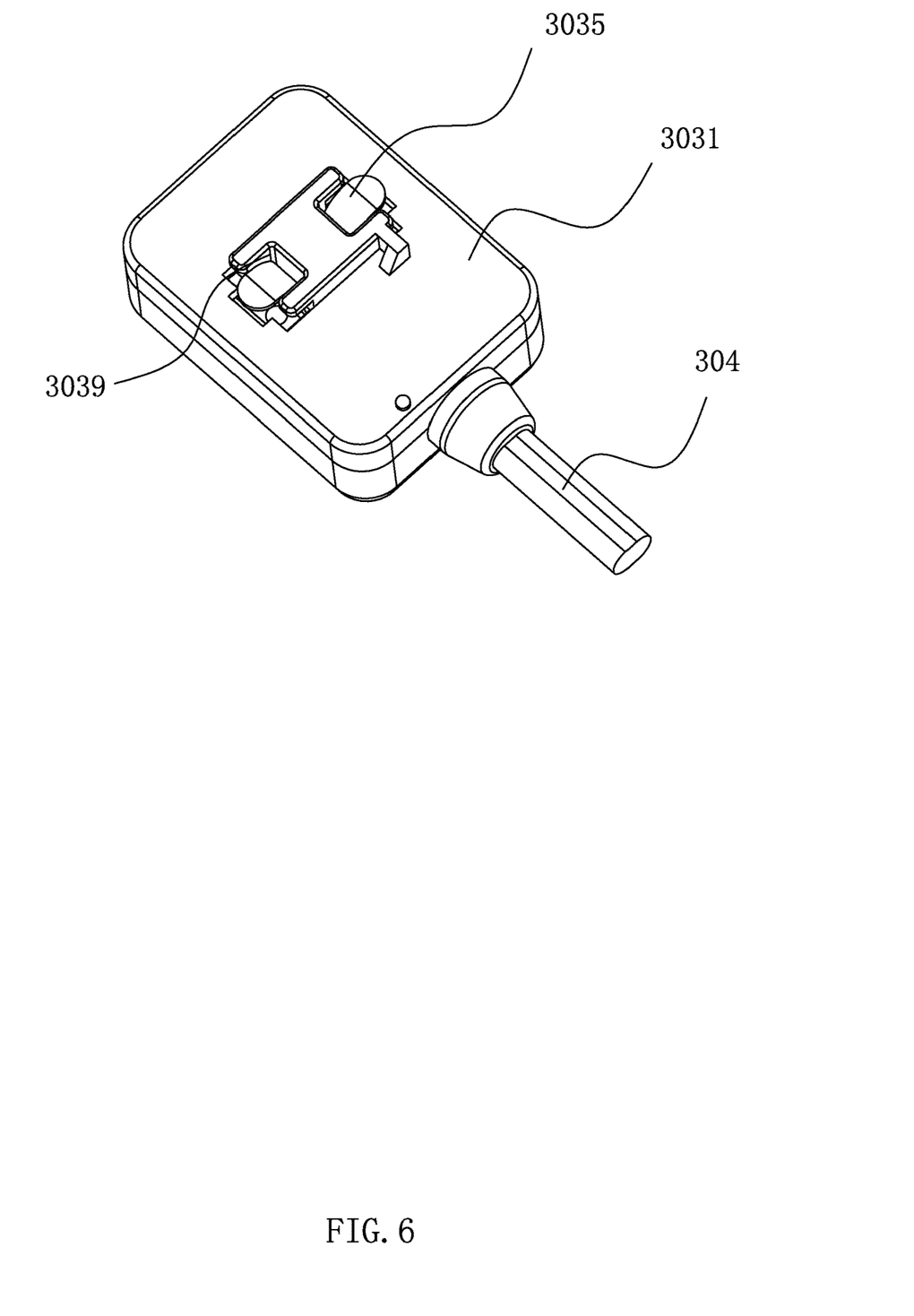
FIG. 6 is a schematic structural diagram of a second power taking head of the present invention.

The specific shape and fixing method of the elastic electrical contact 3033 can be designed according to needs. In order to facilitate manufacturing, installation and use, in this embodiment, the bottom cover 3031 is provided with a T-shaped structure 3038 that protrudes outward, and the T-shaped structure 3038 is provided with opening 3039 for the elastic piece 3035 to protrude out and bend from it. The positioning portion 3034 and the elastic piece 3035 are integrally formed and manufactured. The positioning portion 3034 has a cubic structure and is formed by bending a metal sheet. The elastic piece 3035 extends from the middle area of the cubic structure and has a C-shaped structure. The PCB 3036 is disposed between the positioning portion 3034 and the upper cover 3032. A side of the positioning portion 3034 facing the PCB 3036 is provided with a protrusion that abuts the contact piece of the PCB 3036, the protrusion is in electrical contact with the contact piece.

Two sides of the U-shaped groove of the track 3021 of this embodiment are respectively provided with grooves perpendicular to the corresponding side and arranged face to face, and the grooves are used to install the conductive strips 3022. The cross section of the conductive strip 3022 can be rectangular, circular, or other shapes. In this embodiment, the outer side of the cross section of the conductive strip 3022 is arc-shaped. Specifically, the cross section of the conductive strip 3022 is circular.

In order to effectively prevent the installed second power taking head 303 from falling off the track 3021, the depth of the groove is greater than the width of the conductive strip 3022 in the direction perpendicular to the side of the U-shaped groove.

Figure 8:
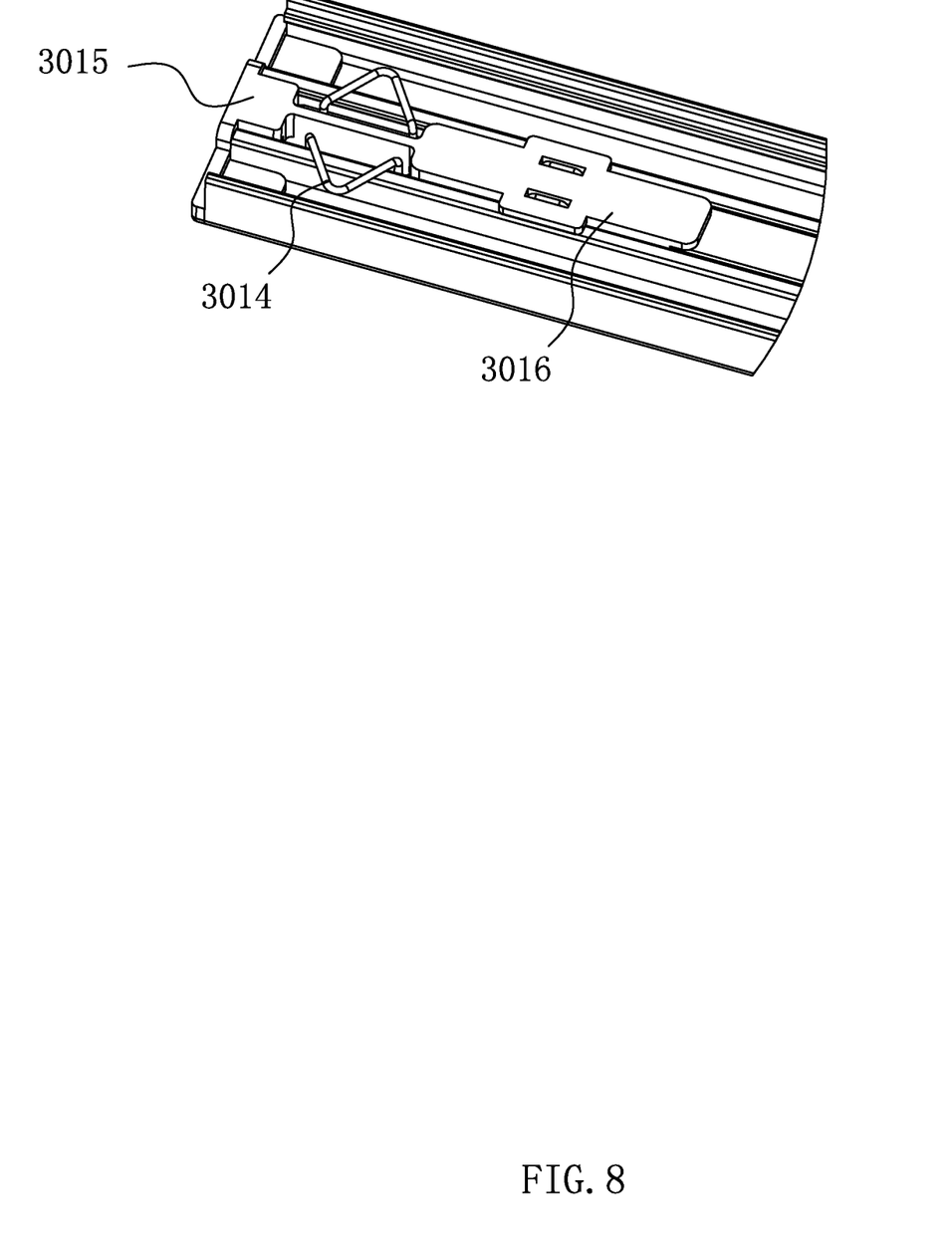
FIG. 8 is an enlarged schematic view of part A in FIG. 7.
Figure 11:
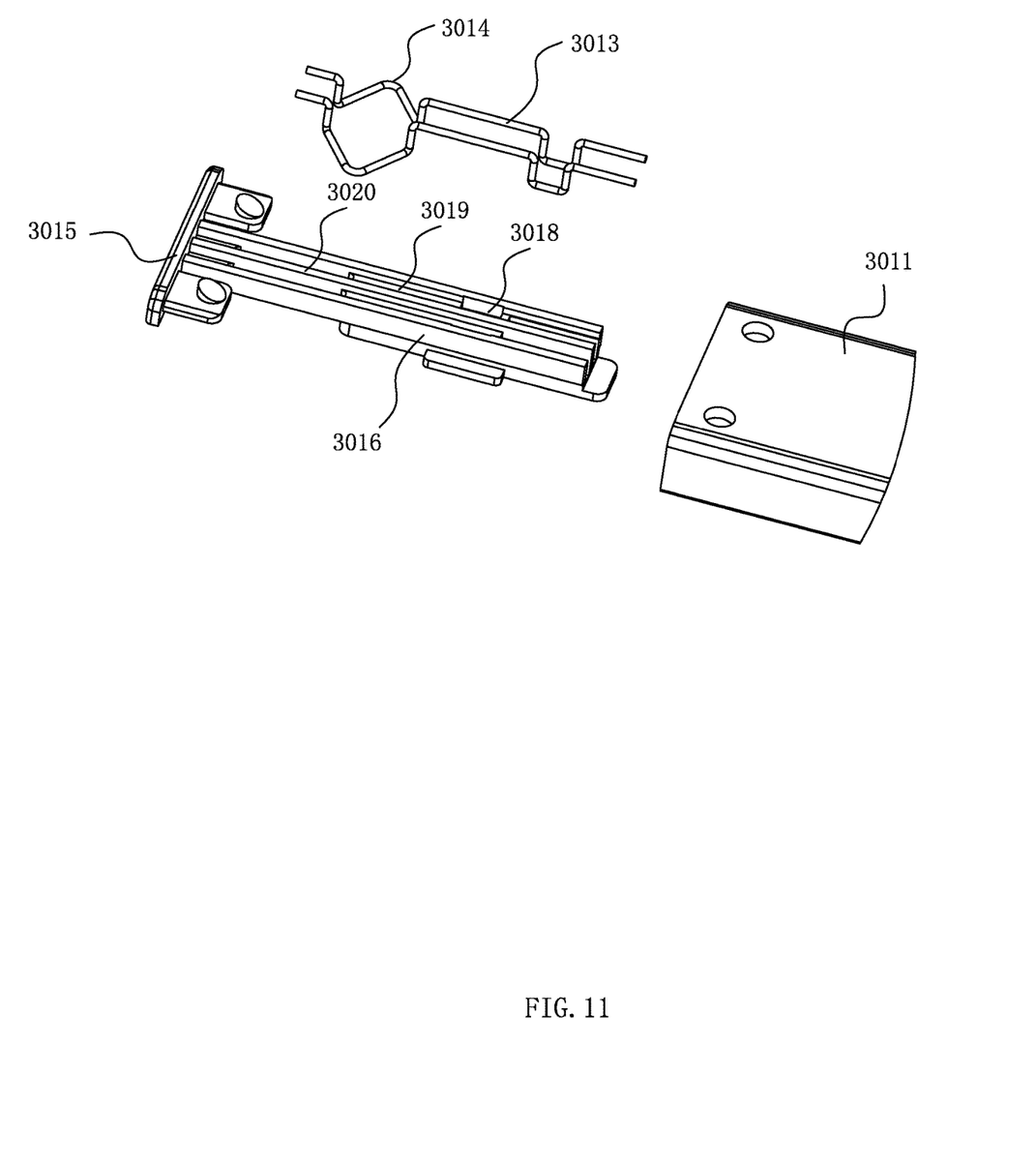
FIG. 11 is an enlarged schematic view of part B in FIG. 10.

In order to facilitate manufacturing and installation, in this embodiment, the electrical contact 3012 is formed by bending a bar-shaped metal rod. The electrical contact 3012 includes a wiring portion 3013 connected with the slide track 3011 and an elastic portion 3014 bent into a V shape on both sides, and the elastic portions 3014 of the two electrical contacts 3012 snap into the grooves on both sides and abut against the corresponding conductive strip 3022.

Figure 7:
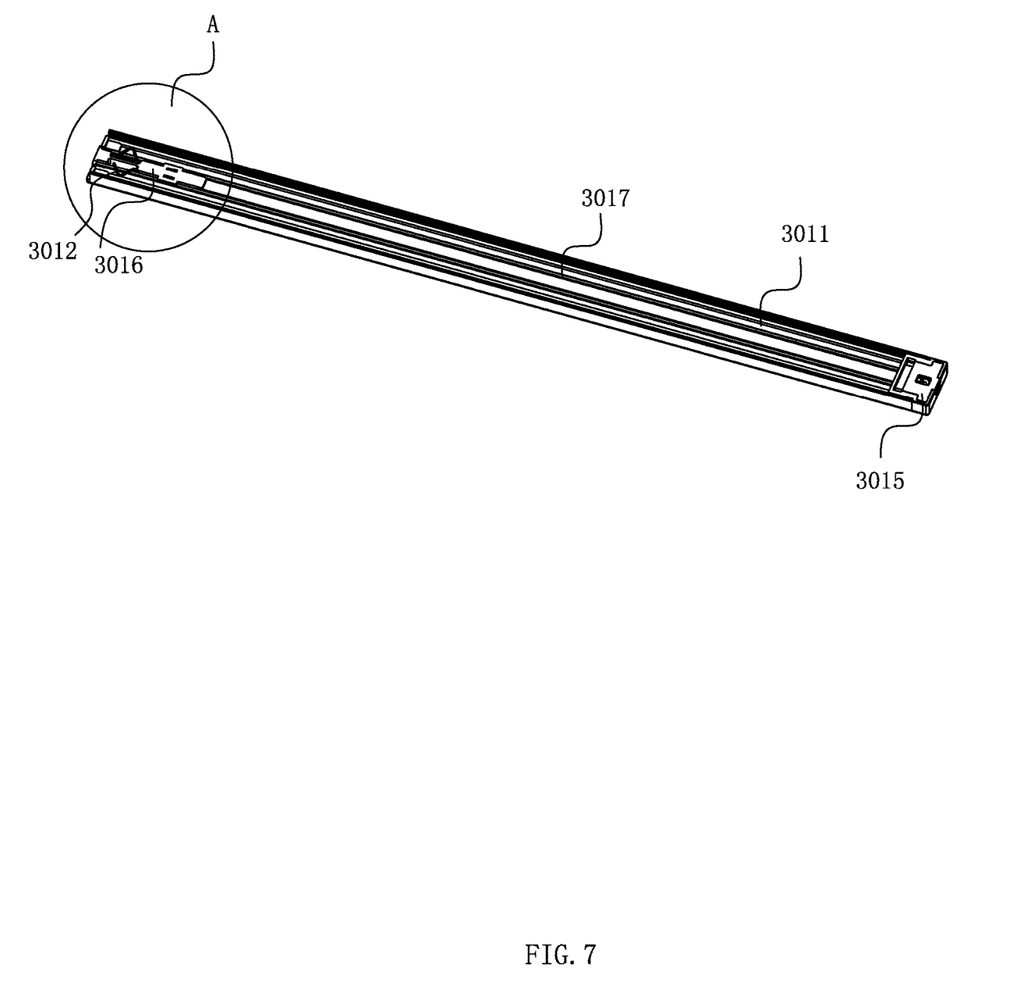
FIG. 7 is a schematic structural diagram of a first moving part of the present invention.
Figure 9:
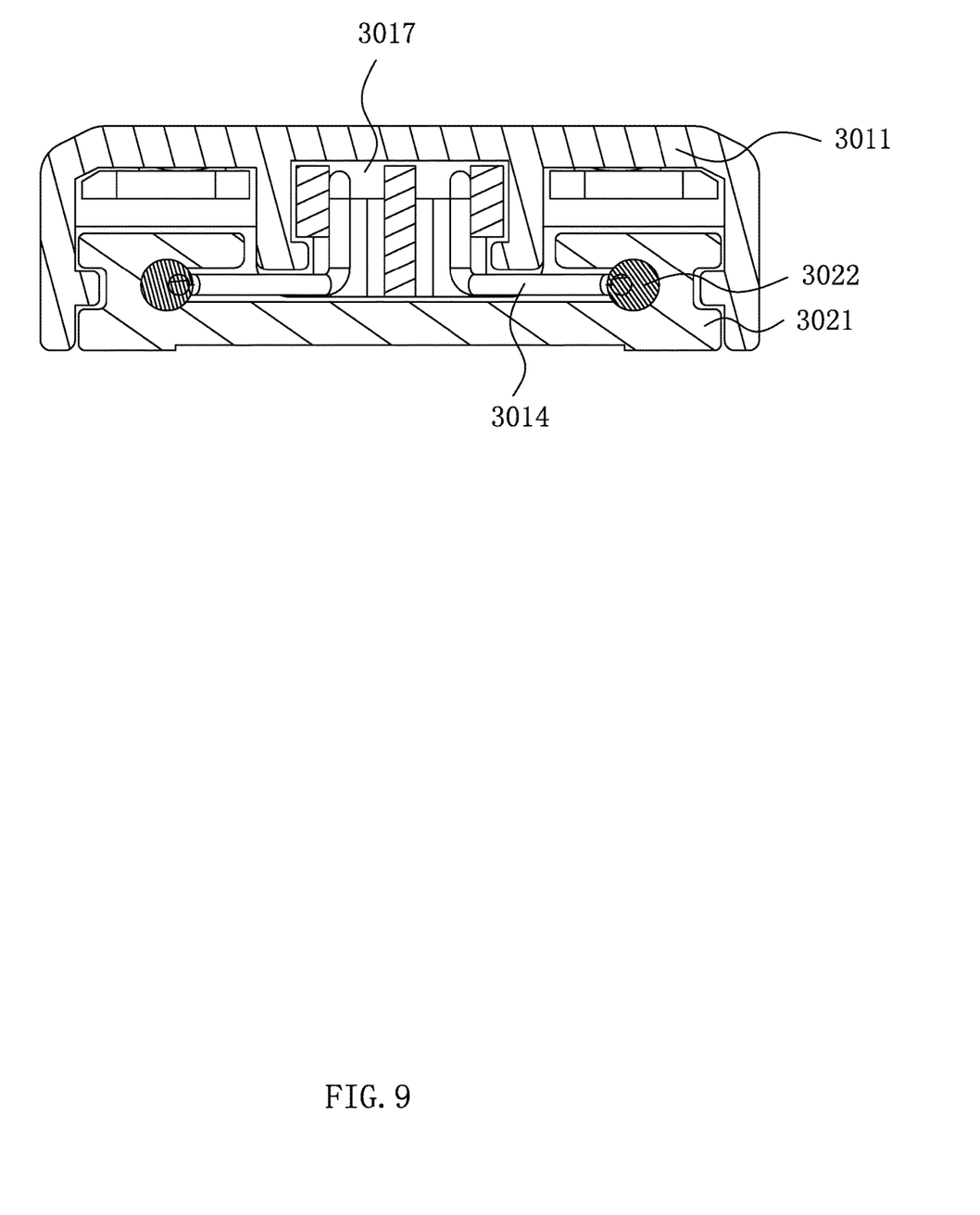
FIG. 9 is a schematic cross-sectional view of a retractable power supply track of the present invention.

In order to facilitate the arrangement of wiring and electrical contacts 3012, end covers 3015 are provided at both ends of the slide track 3011, one of the end covers 3015 has a mounting section 3016 extending toward the middle of the slide track 3011, and the mounting section 3016 is used to install the electrical contact 3012. The slide track 3011 is overlaid on the track 3021, and the slide track 3011 is also a U-shaped groove structure, which is arranged opposite to the U-shaped groove of the track 3021, the inner sides of both sides of the slide track 3011 are provided with convex edges, and the outer sides of the track 3021 are provided with grooves matching the convex edges.

Figure 10:
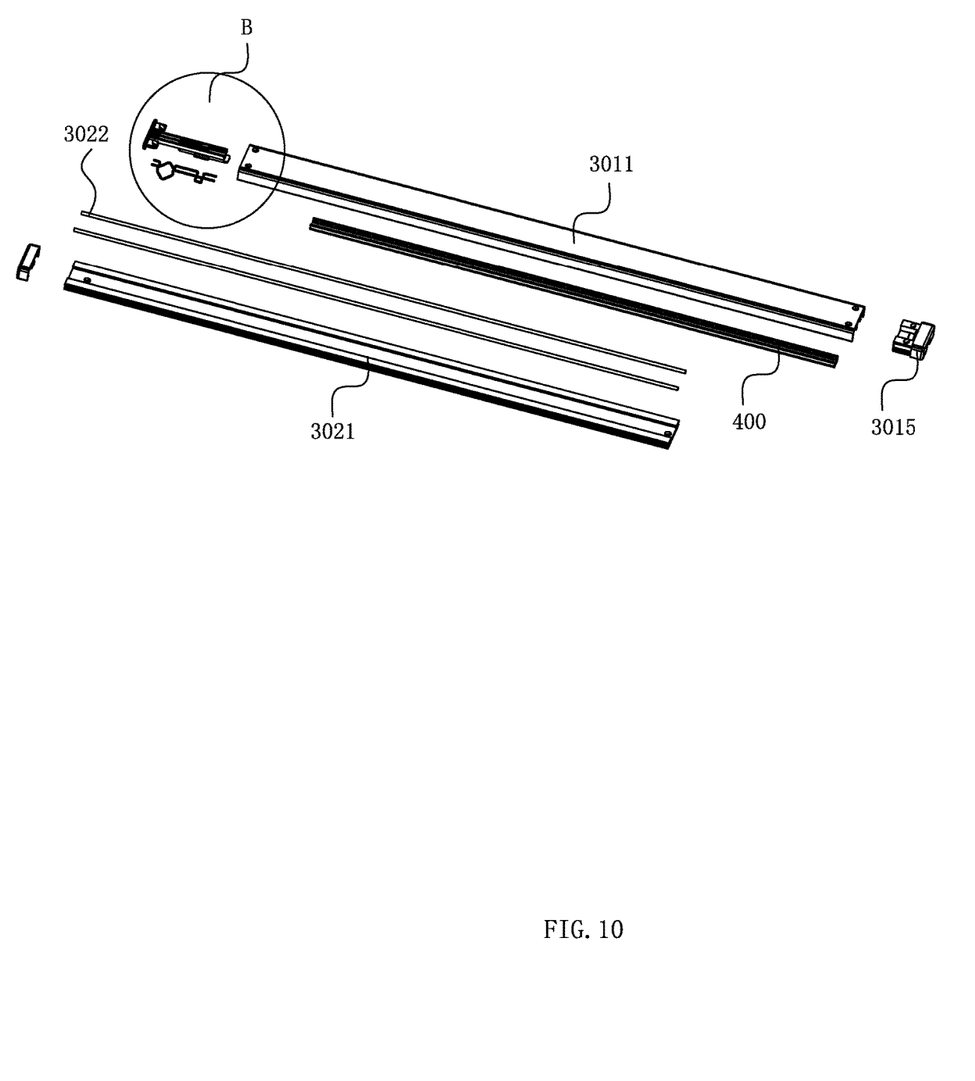
FIG. 10 is an exploded schematic view of a retractable power supply track (excluding the second power taking head) of the present invention.

The bottom of the slide track 3011 is provided with a wire mounting groove 3017. The slide track 3011 is also provided with a wire sealing cover 400 engaged with the wire mounting groove 3017. One end of the wire (not shown in the figures) in the wire mounting groove 3017 is connected to the wiring part 3013, and the other end of the wire extends to the terminal on the end cover on the other side.

The mounting section 3016 is inserted into the wire mounting groove 3017, and the side of the mounting section 3016 facing the wire mounting groove 3017 is provided with a strip-shaped groove 3020 for fixing the electrical contact 3012. The strip-shaped groove 3020 is provided with a fixing hole 3018 and an opening 3019. In the electrical contact 3012, the wiring portion 3013 has a rectangular a rectangular bending which gets stuck into the fixing hole 3018, and the elastic portion 3014 extends out of the opening 3019.

The structure of the power supply track 100 and the first power taking head 200 adopt the existing technology, or adopt the same structure as the retractable power supply track 300. In this embodiment, the structure of the power supply track 100 is similar to that of the second moving part 302, and the structure of the first power taking head 200 is the same as that of the second power taking head 303, and the method of installation and disassembly is also the same.

The above disclosure has been described by way of example and in terms of exemplary embodiment, and it is to be understood that the disclosure is not limited thereto. Rather, any modifications, equivalent alternatives or improvement etc. within the spirit of the invention are encompassed within the scope of the invention as set forth in the appended claims.

What is claimed is:

1. A shelf (1000), comprising
   a column (1001),
   a support arm (1002), and
   a shelf power supply system comprising a power supply track (100), a first power taking head (200) arranged on the power supply track (100), and a retractable power supply track (300), wherein
   the power supply track (100) is vertically arranged on or near the column (1001),
   the first power taking head (200) has an external wiring (201),
   the retractable power supply track (300) comprises a first moving part (301) and a second moving part (302) electrically connected to the first moving part (301) and slidable thereon, and the second moving part (302) has a terminal (304),
      wherein the first moving part (301) comprises:
         a slide track (3011);
         two electrical contacts (3012), fixedly arranged on the slide track (3011);
      and the second moving part (302) includes:
         a track (3021) matched to the slide track (3011);
         two conductive strips (3022), provided on the track (3021) and extending along its lengthwise direction thereof, and two electrical contacts (3012) in electrical contact with the two conductive strips (3022), respectively;
         a second power taking head (303) provided on the track (3021) and electrically connected to the terminal (304);
   and the retractable power supply track (300) is set on the support arm (1002).

2. The shelf power supply system as claimed in claim 1, wherein the second power taking head (303) is detachably fixedly installed on the track (3021).

3. The shelf power supply system as claimed in claim 2, wherein the second power taking head (303) includes:
   bottom cover (3031);
   an upper cover (3032), which is arranged on the bottom cover (3031) and forms a installation cavity between the two;
   two elastic electrical contacts (3033), respectively used for electrically connecting a conductive strip (3022), a main body of the elastic electrical contact is arranged in the installation cavity, one end of the elastic electrical contact extends out of the installation cavity and is in electrical contact with a corresponding conductive strip (3022) when the second power taking head (303) is disposed on the track (3021).

4. The shelf power supply system as claimed in claim 3, wherein a cross section of the track (3021) is a U-shaped groove, and two conductive strips (3022) are respectively disposed on both sides of the U-shaped groove.

5. The shelf power supply system as claimed in claim 4, wherein the elastic electrical contact (3033) includes a positioning portion (3034) located in the installation cavity and an elastic piece (3035) which is formed and extends out of the installation cavity from the positioning portion (3034), and the positioning portion (3034) is electrically connected to the terminal (304).

6. The shelf power supply system as claimed in claim 5, wherein the elastic pieces (3035) of the two elastic electrical contacts (3033) are bent toward opposite sides and respectively abut against the corresponding conductive strips (3022), making the elastic pieces tensioning to achieve the fixed installation of the second power taking head.

7. The shelf power supply system as claimed in claim 6, wherein both sides of the U-shaped groove of the track (3021) are respectively provided with grooves perpendicular to the corresponding side and arranged face to face, and the grooves are used for installing the conductive strips (3022).

8. The shelf power supply system as claimed in claim 7, wherein a depth of the groove is greater than a width of the conductive strip (3022) in a direction perpendicular to the vertical side of the U-shaped groove.

9. The shelf power supply system as claimed in claim 7, wherein the slide track (3011) is overlaid on the track (3021), and the slide track (3011) is also a U-shaped groove structure, which is arranged opposite to the U-shaped groove of the track (3021)), and the inner sides of both sides of the slide track (3011) are provided with convex edges, and the outer sides of the track (3021) are provided with clamping grooves matching the convex edges.

10. The shelf power supply system as claimed in claim 7, wherein the electrical contact (3012) is formed by bending a bar-shaped metal rod.

11. The shelf power supply system as claimed in claim 10, wherein each electrical contact (3012) includes a wiring portion (3013) connected with the slide track (3011) and an elastic portion (3014) bent into a V shape on both sides, and the elastic portions (3014) of the two electrical contacts (3012) snap into the grooves on both sides and abut against the corresponding conductive strip (3022).

12. The shelf power supply system as claimed in claim 11, wherein end covers (3015) are provided at both ends of the slide track (3011), and the end cover (3015) close to the power supply track (100) has a mounting section (3016) extending toward the middle of the slide track (3011), and the mounting section (3016) is used to install the electrical contact (3012).

13. The shelf power supply system as claimed in claim 12, wherein a wire mounting groove (3017) is provided at the bottom of the slide track (3011).

14. The shelf power supply system as claimed in claim 13, wherein the slide track (3011) is further provided with a wire sealing cover (400) that is engaged with the wire mounting groove (3017).

15. The shelf power supply system as claimed in claim 14, wherein the mounting section (3016) is inserted into the wire mounting groove (3017), and one side of the mounting section (3016) facing the wire mounting groove (3017) is provided with a strip-shaped groove (3020) for fixing the electrical contact (3012), and the strip-shaped groove (3020)

is provided with a fixing hole (3018) and an opening (3019), and in the electrical contact (3012), the wiring portion (3013) has a rectangular bending which gets stuck into the fixing hole (3018), and the elastic portion (3014) extends out of the opening (3019).

16. The shelf power supply system as claimed in claim 1, wherein the first power taking head (200) or/and the second power taking head (303) is provided with a PCB (3036) with a polarity conversion circuit.

\* \* \* \* \*